ns filed.

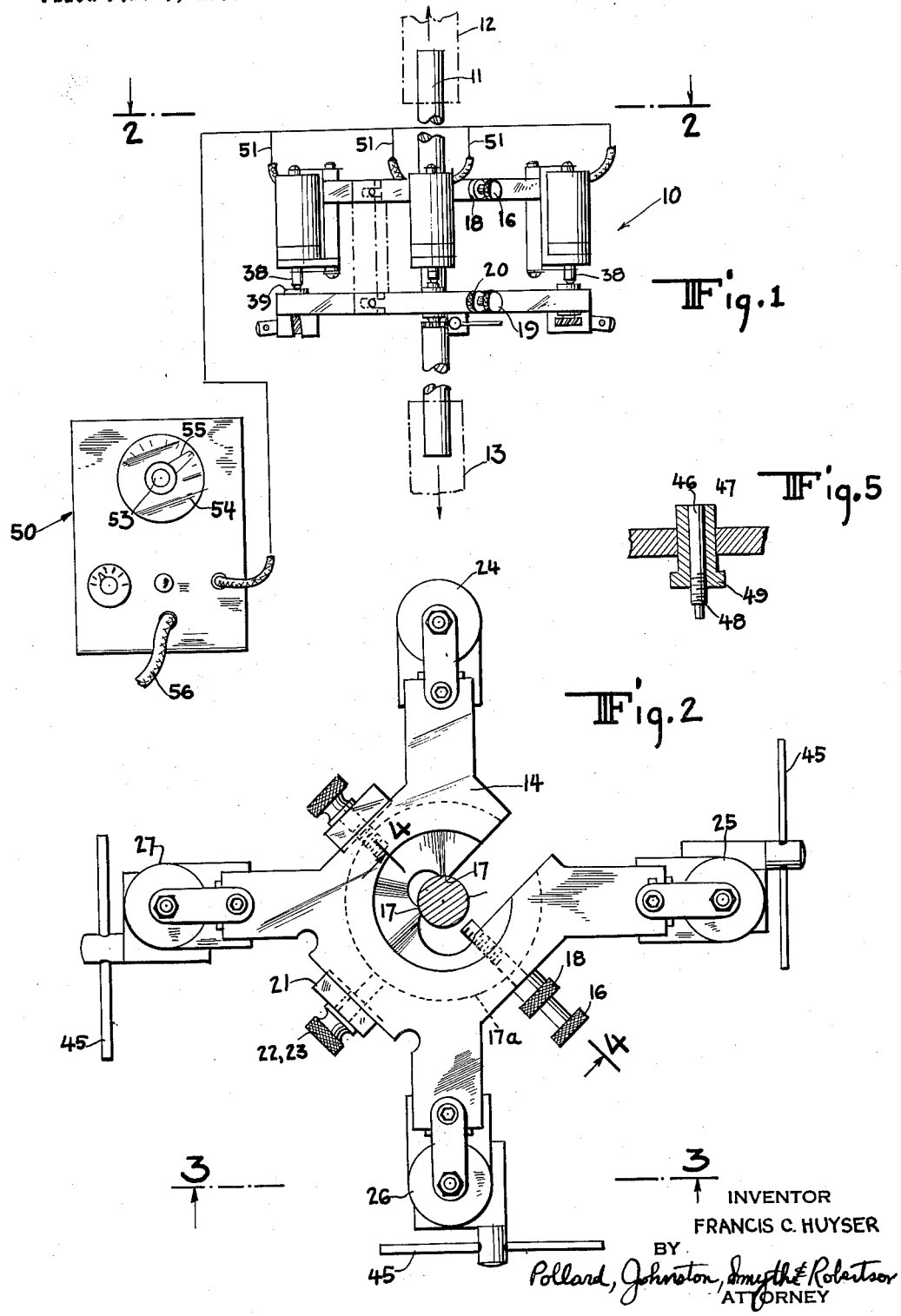

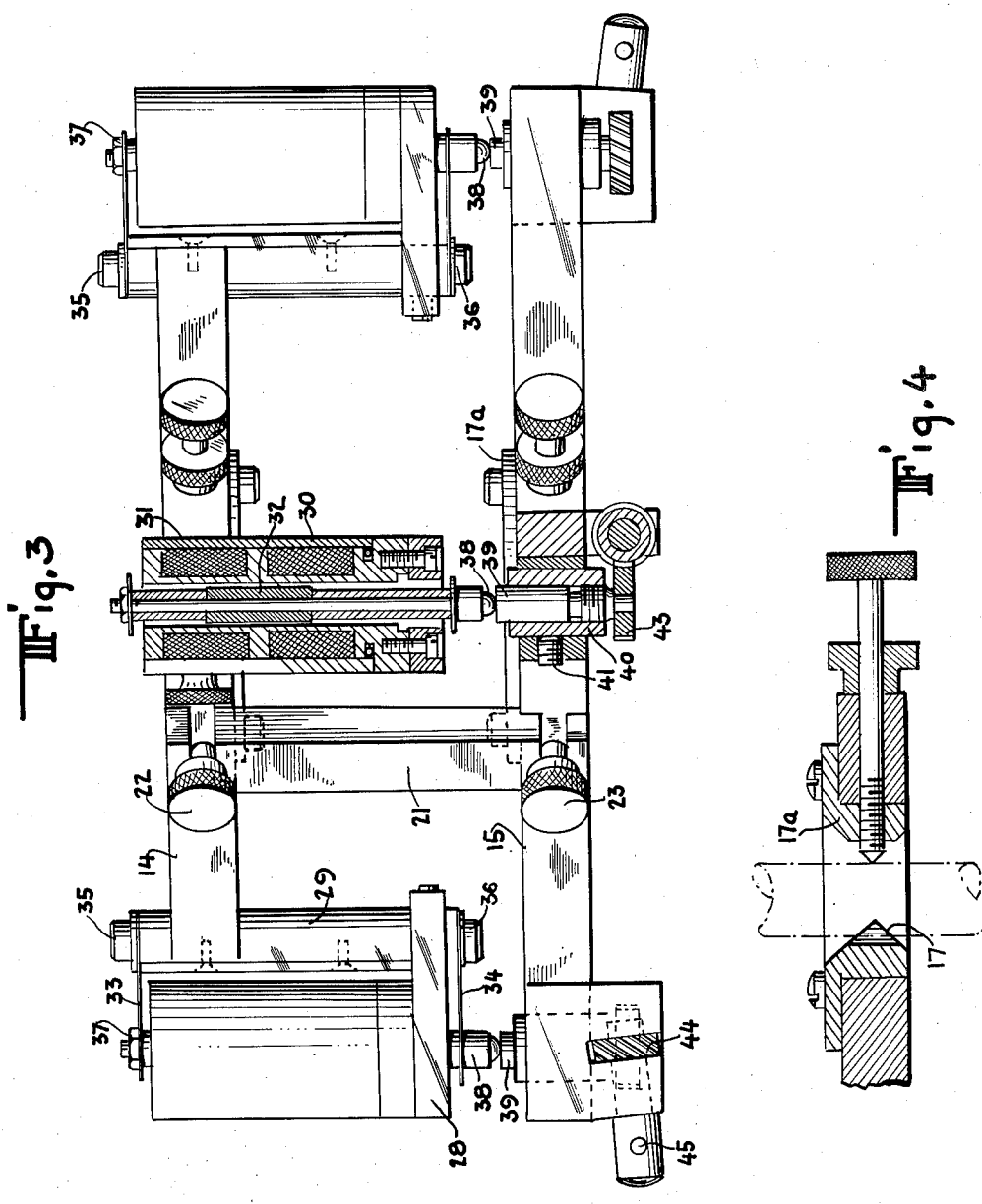

United States Patent Office 3,040,435
Patented June 26, 1962

3,040,435
TESTING MACHINES
Francis C. Huyser, Moline, Ill., assignor to Ametek, Inc., a corporation of Delaware
Filed Feb. 3, 1959, Ser. No. 790,895
6 Claims. (Cl. 33—174)

The present invention relates to an arrangement for indicating the proper alignment of a test specimen in a testing machine.

In tension, creep or similar testing, the test specimen may be held at each end by a gripping device. To align the axis of the specimen with the centerline of the heads of the testing machine, the grips may be adjusted by means of shims and liners. When assurance or more accurate alignment is necessary, which is highly important in the testing of many materials, some type of universal joint, such as spherically seated bearings, is used to connect the test specimen to the heads of the testing machine. Eccentric loading of the test specimen produced by the gripping device causes non-uniform stress distribution in the specimen, such eccentricity in loading causing certain parts of the specimen to reach the proportional limit before other parts or to be unevenly stressed. If average strain measurements are made under an eccentric condition, the value of the proportional limit determined may be somewhat lower than if the specimen had been uniformly stressed. Obviously, the effect of eccentric loading is important in creep tests as well as in tests to determine the elastic or other properties of materials.

It is apparent that accurate testing is dependent upon precise alignment of the test specimen and the heads of the testing machine. Therefore, means are needed to indicate the existence of a misalignment condition.

One of the objects of the invention is to provide a device for checking misalignment of test specimens so that such can be corrected if necessary.

In one aspect of the invention an indicating device is provided which permits monitoring of the alignment of the specimen while it is being stressed. This can be accomplished by using spaced means, such as yokes, which can be clamped to a test specimen, the test specimen being in a testing machine, such as a creep testing machine. A plurality of motion transducers are mounted between the yokes and are off-center relative to the axis of the test specimen. The transducers, for example, may be differential transformers selectively connectable to a null balancing indicator or the like. The yokes may have an adjustable means for nulling the device before the test is started. Then, as the specimen is loaded, the readings of each of the transducers can be compared which will indicate any eccentricity in the loading of the specimen. This will permit adjustment of the gripping means for the test specimen. The yokes may be held temporarily together by a spacer bar to facilitate mounting and clamping onto the specimen.

These and other objects, advantages and features of the invention will become apparent from the following description and drawings which are merely exemplary.

In the drawings:

FIG. 1 shows an elevational view of the alignment checking device and indicating unit.

FIG. 2 shows a top plan view of the alignment checking device.

FIG. 3 shows an elevational sectional view of the alignment checking device taken along the line 3—3 of FIG. 2.

FIG. 4 shows a fragmentary sectional view of the alignment checking device clamp taken along the line 4—4 in FIG. 2.

FIG. 5 is a fragmentary view of the lower yoke.

The alignment checking device 10 (FIGS. 1 and 2) is installed around the test specimen 11 which is held at its ends by the grips 12 and 13 of a creep testing machine (not shown). An example of such a machine is illustrated in U.S. Patent No. 2,837,915. The alignment checking device includes upper and lower yoke members 14 and 15, respectively, said yoke members being axially spaced from each other relative to the test specimen. Set screw 16 threadably mounted in anvil member 17a forces the test specimen 11 into contact with anvil surfaces 17 of anvil member 17a inserted in upper yoke member 14 so as to secure upper yoke member 14 to the specimen, jam nut 18 serving to lock set screw 16 when it has been adjusted against the specimen. In a similar fashion, set screw 19 with jam nut 20 clamps the lower yoke member 15 to test specimen 11.

Yoke members 14 and 15 (FIG. 3) are initially spaced from one another upon installation around test specimen 11 by means of spacer bar 21 which is clamped to the yoke members by thumb screws 22 and 23. When the yoke members 14 and 15 are clamped to the test specimen, thumb screws 22 and 23 may be loosened so that spacer bar 21 may be removed. In this manner, the yoke members 14 and 15 are spaced from one another along the test specimen and also securely fastened to the test specimen.

In FIGS. 1 and 2 it may be seen that differential or similar transformer pickups or transducers 24, 25, 26 and 27 are supported by brackets 28 connected to studs 29 of upper yoke member 14. The transformer pickups (FIG. 3) include a housing 30 in which can be mounted windings 31. The transformer pickup armature 32 positioned within winding 31 is supported for substantially axial motion with respect to the windings by means of flat springs 33 and 34 which are attached to the studs 29 by means of screws 35 and 36, respectively. Flat spring 33 is adjustably attached to armature 32 by adjusting nut 37. The lower portion of armature 32 is provided with a follower 38.

When the yoke members 14 and 15 are clamped to the test specimen 11, followers 38 of the transformer pickups rest upon the adjustable anvils 39. Adjustable anvil 39 is slidably mounted within bushing 40 which is held in lower yoke member 15 by set screw 41. The lower portion of bushing 40 is threaded to receive adjusting screw 42 to which is attached wheel 43. Anvils 39 (FIGS. 2, 4) are adjusted by rotating their adjustment screws 42 by means of worms 44 which are threadably mounted within lower yoke member 15, T-handles 45 being provided to manually rotate worms 44. Lower yoke member 15 (FIGS. 2, 5) may be provided with a non-adjustable anvil 46, anvils 46 being initially set with respect to bushings 47 by means of screw 48 locked by nut 49.

The alignment checking device is used in conjunction with control unit 50 schematically shown in FIG. 1. Leads 51 connect each individual transformer pickup to control unit 50 and selector switch 52 can be provided to permit a particular or selected transformer pickup to be connected to comparison circuitry and an adjustable transformer device (not shown) within control unit 50 by means of knob 53. A null indicating device (not shown), such as a galvanometer, may be used to detect when the adjustable transformer device within control unit 50 is properly set to match the signal of the particular transformer pickup. With this balance condition, dial 54 and pointer 55 operated by knob 53 provide a reference value for the particular transformer pickup. Also, the pointer 55 could be frictionally held on its shaft and set to zero. Cable 56 provides power to control unit 50. Other types of indicating devices can be used.

Four transducers are shown but two located substantially at 90° apart.

Prior to conducting a creep test, test specimen 11 (FIG. 1) is installed within grips 12 and 13 of the testing apparatus, the alignment checking device 10 being installed so that specimen 11 will rest against the anvil surfaces 17 of the upper and lower yoke members 14 and 15, respectively. It is then clamped by set screws 16 and 19. At this point, the upper and lower yoke members 14 and 15, respectively, will be spaced substantially parallel and at a distance determined by spacer bar 21. With the yoke members firmly clamped to the test specimen 11, thumb screws 22 and 23 are loosened so as to permit removal of spacer bar 21. It then normally is necessary to establish the initial reference signal conditions for the transformer pickups 24, 25, 26 and 27. By operation of the adjustable anvils 39, the transformer pickup armatures 32 can be positioned with respect to their windings 31 so as to establish an initial reference reading for the balance condition as indicated on dial 54 of control unit 50. If desired, adjustable anvils 39 can be set so that the transformer pickups associated with adjustable anvils 39 will conform to the balance reading of the transformer pickup associated with non-adjustable anvil 46. It is evident that with the initial setting of the alignment checking device 10, all of the transformer pickups will have been set so as to have a corresponding initial value.

By conventional methods, a preload would be applied to test specimen 11 held by grips 12 and 13. Under the preloading condition, test specimen 11 will elastically deform so that the spacing between upper and lower yoke members 14 and 15 respectively, will be increased. If test specimen 11 is accurately aligned with the loading device of the creep testing machine and with grips 12 and 13, the specimen will be uniformly stressed so that its deformation will be in a substantially straight line. In this case, the spacing between the yoke members will uniformly increase upon application of the preload. This uniform increase is indicated by obtaining the balance reading of each transformer pickup by use of control unit 50.

In the case where the test specimen 11 is eccentrically loaded due to misalignment of test specimen 11 with respect to grips 12 and 13, or for other reasons, a non-uniform stress pattern will be established in specimen 11 by the preloading so that deformation along a curved and distorted line will result. Under this condition, the spacing between upper and lower yoke members 14 and 15, respectively, will increase in a non-uniform manner. Upon balancing the signal from each of the transformer pickups by means of control unit 50, the unequal motion of the various elements of the yoke members with respect to one another will be indicated. The bending of the specimen is measured. In this manner, the existence and magnitude of the misalignment or eccentricity of force application to test specimen 11 are indicated and can be corrected. Because the transducers are spaced from the center, any bending motion to the transducer will be amplified. By use of the present invention, an actual specimen being tested may be checked for alignment.

It should be evident that the system described can be used to check the alignment of the specimen for other forms of material testing as well as creep testing and that details of construction can be varied without departing from the spirit of the invention except as defined in the appended claims.

What is claimed is:

1. In a testing machine alignment checking device, the combination including a plurality of yoke means adapted to be spaced from each other along the axis of a specimen to be tested with their planes initially at substantially right angles to said axis and adapted to be engaged with said test specimen, and at least three motion transducer means for indicating the relative positions of said planes of said yoke means during testing, said motion transducer means engaging each of the planes of said yoke means at at least three different points, at least one of said three different points in each plane being displaced from a line passing through two other of said three different points, whereby any misalignment of said test specimen is indicated.

2. In a testing machine alignment checking device, the combination including a plurality of yoke means adapted to be axially spaced from each other along a test specimen and presenting gauging planes initially at substantially right angles to said specimen and adapted to be engaged with said test specimen, at least three motion transducer means mounted on said yoke means, said motion transducer means engaging each of the planes of said yoke means at at least three different points, at least one of said three different points in each plane being displaced from a line passing through two other of said three different points, said transducer means producing signals in response to changes in the relative positions of said planes of said yoke means during testing, and means for indicating the signals of said transducer means, whereby unequal changes of the signals of said transducer means indicate misalignment of said test specimen.

3. In a testing machine alignment checking device, the combination including a plurality of yoke means adapted to be axially spaced from each other along a test specimen, and presenting gauging planes initially at substantially right angles to said specimen and each being adapted to be engaged with said test specimen in at least two points, at least three motion transducer means producing signals proportional to the relative positions of said planes of said yokes, said motion transducer means engaging each of the planes of said yoke means at at least three different points, at least one of said three different points in each plane being displaced from a line passing through two other of said three different points, and indicating means for said signals, whereby unequal changes in the relative positions of said planes of said yokes during testing causing unequal changes in said signals will indicate lack of alignment of said specimen with said testing machine.

4. In a testing machine alignment checking device, the combination including a plurality of yoke means adapted to be spaced from each other along the axis of a test specimen and presenting gauging planes initially at substantially right angles to said axis and adapted to be engaged with said test specimen, at least three motion transducer means mounted on said yoke means, anvil means mounted on said yoke means in alignment with said motion transducer means, said anvil means being disposed at at least three different points of said yoke means, at least one of said three different points being displaced from a line passing through two other of said three different points, said transducer means when moved by said anvil means producing signals proportional to the relative positions of said planes of said yoke means, and means for indicating said signals, whereby unequal changes in the signals of said transducer means indicate misalignment of said test specimen.

5. In a testing machine alignment checking device, the combination including a plurality of yoke means adapted to be spaced from each other along the axis of a test specimen and presenting gauging planes initially at substantially right angles to said axis and adapted to be engaged with said test specimen, at least three transformer pickups mounted on said yoke means, anvil means mounted on said yoke means in alignment with said transformer pickups, said anvil means being disposed at at least three different points of said yoke means, at least one of said three different points being displaced from a line passing through two other of said three different points, said transformer pickups having an armature means moved by said anvil means during testing to produce signals proportional to the relative positions of said planes of said yoke means, and means for indicating said signals, whereby unequal changes in the signals of said transformer pickups indicate misalignment of said test specimen.

6. In a testing machine alinement checking device, the combination including a plurality of yoke means adapted to be spaced along the axis of a test specimen and presenting gauging planes initially at substantially right angles to said axis and each being adapted to be engaged with said test specimen in at least three points, at least three transformer pickups for producing a signal proportional to the relative positions of said planes of said yokes, anvil means adjustably mounted in said yoke means opposite to and in alignment with said transformer pickups, said anvil means being disposed at at least three different points of said yoke means, at least one of said three different points being displaced from a line passing through two other of said three different points, said transformer pickups having armature means moved by said anvil means, said anvil means being adjustable to provide a predetermined transformer pickup signal, and means for providing an indication of the signals from said transformer pickups, whereby unequal changes in the relative positions of said planes of said yokes during testing cause unequal changes in said signals to indicate lack of alignment of said specimen with said testing machine.

References Cited in the file of this patent
UNITED STATES PATENTS

| | | |
|---|---|---|
| 153,102 | Miles | July 14, 1874 |
| 2,416,664 | Ruge | Feb. 25, 1947 |
| 2,656,818 | Moore | Oct. 27, 1953 |
| 2,663,085 | Ruge | Dec. 23, 1953 |
| 2,767,476 | Strimel | Oct. 23, 1956 |

UNITED STATES PATENT OFFICE
CERTIFICATE OF CORRECTION

Patent No. 3,040,435 June 26, 1962

Francis C. Huyser

It is hereby certified that error appears in the above numbered patent requiring correction and that the said Letters Patent should read as corrected below.

Column 3, line 71, for "with their" read -- and presenting gauging --; column 4, line 6, for "checkinng" read -- checking --; line 28, for "two" read -- three --; column 6, under "References Cited" add the following:

2,739,389 Carter -------------- Mar. 27, 1956

Signed and sealed this 15th day of January 1963.

(SEAL)
Attest:

ERNEST W. SWIDER
Attesting Officer

DAVID L. LADD
Commissioner of Patents